US011220356B2

(12) United States Patent
Troy et al.

(10) Patent No.: US 11,220,356 B2
(45) Date of Patent: Jan. 11, 2022

(54) NON-DESTRUCTIVE INSPECTION USING UNMANNED AERIAL VEHICLE

(71) Applicant: The Boeing Company, Chicago, IL (US)

(72) Inventors: James J. Troy, Issaquah, WA (US); Gary E. Georgeson, Tacoma, WA (US); Joseph L. Hafenrichter, Auburn, WA (US); Scott W. Lea, Renton, WA (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 16/238,376

(22) Filed: Jan. 2, 2019

(65) Prior Publication Data
US 2020/0207488 A1    Jul. 2, 2020

(51) Int. Cl.
| | | |
|---|---|---|
| *B64F 5/60* | (2017.01) | |
| *B64C 39/02* | (2006.01) | |
| *G05D 1/00* | (2006.01) | |
| *G01N 21/95* | (2006.01) | |

(Continued)

(52) U.S. Cl.
CPC ............ *B64F 5/60* (2017.01); *B64C 39/024* (2013.01); *G05D 1/0094* (2013.01); *B64C 2201/126* (2013.01); *G01N 21/9515* (2013.01); *G01N 22/02* (2013.01); *G01N 27/90* (2013.01); *G01N 2021/9518* (2013.01)

(58) Field of Classification Search
CPC ... B64F 5/60; B64C 39/024; B64C 2201/126; G05D 1/0094; G01N 21/9515; G01N 22/02; G01N 27/90; G01N 2021/9518
See application file for complete search history.

(56) References Cited

U.S. PATENT DOCUMENTS

| | | | |
|---|---|---|---|
| 9,470,658 B2 | 10/2016 | Troy et al. | |
| 10,351,236 B1 * | 7/2019 | Woodworth | ............ B64C 27/08 |

(Continued)

FOREIGN PATENT DOCUMENTS

| | | | | |
|---|---|---|---|---|
| CN | 111246974 A | * | 6/2020 | ............... B60K 1/00 |
| DE | 102016214655 | | 2/2018 | |

(Continued)

OTHER PUBLICATIONS

Extended European Search Report for European Patent Application No. 19217730.1 dated May 29, 2020.

(Continued)

*Primary Examiner* — Hunter B Lonsberry
*Assistant Examiner* — Jay Khandpur
(74) *Attorney, Agent, or Firm* — Kunzler Bean & Adamson

(57) ABSTRACT

Provided is a nondestructive inspection ("NDI") system that includes an unmanned aerial vehicle ("UAV") comprising a body structure and at least one support arm. The support arm includes a first arm portion having a first end coupled to the body structure and a second end coupled to a second arm portion. The second arm portion includes a first end coupled to the second end of the first arm portion and a second end coupled to an NDI scanning device. The support arm also includes a compliant member disposed between the first arm portion and the second arm portion. The NDI scanning device includes one or more NDI sensors.

20 Claims, 9 Drawing Sheets

(51) Int. Cl.
  *G01N 22/02*    (2006.01)
  *G01N 27/90*    (2021.01)

(56) References Cited

U.S. PATENT DOCUMENTS

2008/0210010 A1*  9/2008  Orth ..................... G01N 29/11
                                                    73/592
2010/0036650 A1   3/2010  Vian et al.
2011/0313568 A1* 12/2011  Blackwell ............ B25J 19/0012
                                                    700/245
2018/0120196 A1*  5/2018  Georgeson ............... B64D 1/02
2018/0335404 A1  11/2018  Amer et al.
2020/0166938 A1*  5/2020  Hafenrichter ........... F03D 80/50

FOREIGN PATENT DOCUMENTS

| EP | 3109622      |   | 12/2016 |
|----|--------------|---|---------|
| ES | 2614994      |   | 6/2017  |
| JP | 2018130983   |   | 8/2018  |
| JP | 2018130983 A | * | 8/2018  |
| WO | 2012013878   |   | 2/2012  |

OTHER PUBLICATIONS

U.S. Appl. No. 16/202,347, filed Nov. 28, 2018.
Examination Report for Gulf Cooperation Counsel Patent Application No. GC 2020-38939 dated May 24, 2021.
Communication concerning European Patent Application No. 19217730.1 dated Aug. 20, 2021.

* cited by examiner

NON-DESTRUCTIVE INSPECTION USING UNMANNED AERIAL VEHICLE

FIELD

This disclosure relates generally to inspection activities, and more particularly to remote inspection of structures of objects by an unmanned mobile vehicle.

BACKGROUND

Non-destructive inspection ("NDI") of structures involves thoroughly examining a structure without harming the structure or requiring significant disassembly of the structure. NDI is commonly utilized in the aircraft industry to inspect aircraft structures for any type of internal or external damage to the structures, such as cracks, voids, or porosity, which could adversely affect the performance of the aircraft.

In-person human based inspections of structures and various types of objects can be time consuming, expensive, difficult, and often dangerous for an individual to perform. Oftentimes an unmanned aerial vehicle ("UAV") may be used to deliver a device for visual inspection and some simple IR thermography imaging of large remote structures. However, the current UAV delivery systems do not provide non-stand-off NDI capabilities or simple maintenance assistance.

SUMMARY

The subject matter of the present application has been developed in response to the present state of the art, and in particular, in response to the shortcomings of conventional non-destructive inspection techniques, that have not yet been fully solved by currently available techniques. Accordingly, the subject matter of the present application has been developed to provide an apparatus, system, and associated method that overcome at least some of the above-discussed shortcomings of prior art techniques.

Disclosed herein is an apparatus for a support arm for a non-destructive inspection ("NDI") sensor. The support arm includes a first arm portion having a first end coupled to a body structure of an unmanned aerial vehicle ("UAV") and a second end coupled to a second arm portion. The second arm portion has a first end coupled to a NDI scanning device and a second end coupled to the second end of the first arm portion, and a compliant member disposed between the first arm portion and the second arm portion.

In certain embodiments, the first arm portion is pivotally coupled to the second arm portion, with a rotational joint that allows compliant movement of the second portion of the arm portion with respect to the first arm portion. In other embodiments, the second arm portion is slidably coupled to the first arm portion and telescopes into the first arm portion with a compliant element between them.

Further disclosed is a system for NDI using a UAV and a NDI scanning device coupled to the UAV with the above described support arm. In some embodiments, the system includes a ring mount encircling, and coupled with, the body structure of the UAV. In this example, the at least one support arm is rigidly coupled with ring mount at the first end of the first arm portion. The system may also include a second support arm coupled with the body structure and having a weight to counterbalance the NDI scanning device.

The NDI scanning device may include a mounting mechanism to couple the NDI scanning device to a surface of a structure, where the mounting mechanism is magnetic-based, vacuum-based, electrostatic-based, gripper-based, or adhesive-based. In certain embodiments, the UAV is operable to move using a predetermined flight path using position and orientation data obtained from a tracking system or controlled using a remote-control system. The one or more NDI sensors of the NDI scanning device include, but are not limited to, eddy current sensors, ultrasonic sensors, acoustic sensors, mechanical impedance sensors, optical sensors, x-ray backscatter sensors, computed tomography sensors, surface roughness sensors, IR thermography, microwave sensors, and terahertz sensors. In some embodiments, the one or more NDI sensors are moved relative to a structure to be inspected.

In some embodiments, the system also includes one or more maintenance tools including, but not limited to, a sander, a drill, a brush, a paint sprayer, a marker, an ink stamp, a laser, or a target applicator. The system may also include a locomotion mechanism for moving the NDI scanning device around the surface to be inspected.

Also provided is a method that utilizes the above system to perform non-destructive inspection of a surface using an unmanned aerial vehicle.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples. Like reference numbers signify like elements throughout the description of the figures.

Figure 1:
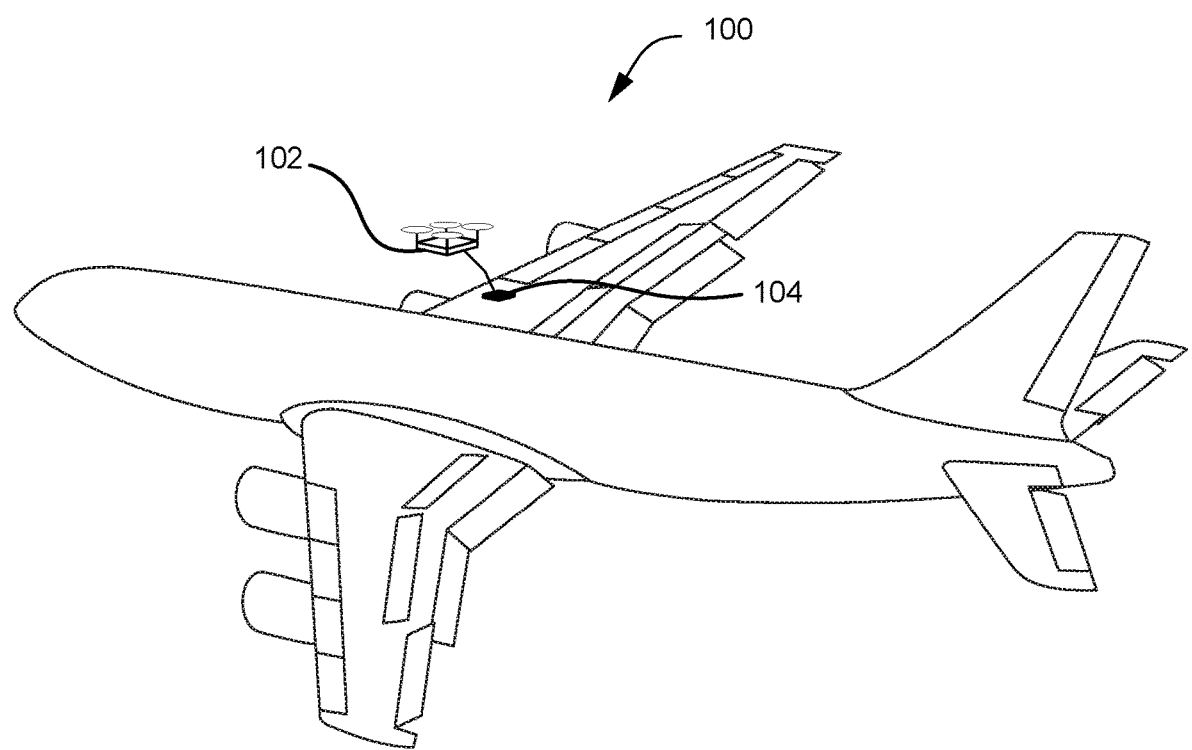
FIG. 1 is a perspective view diagram illustrating one example of a target structure on which non-destructive testing is performed utilizing an unmanned aerial vehicle ("UAV") and an articulated arm in accordance with embodiments of the present disclosure.

FIG. 1 is a perspective view diagram illustrating one example of a target structure 100 on which non-destructive testing is performed utilizing an unmanned aerial vehicle ("UAV") 102 in accordance with embodiments of the present disclosure. In the depicted embodiment, the target structure 100 is an airplane. However, the target structure is any suitable manufactured device or structure such as a vehicle, aircraft, turbine, engine, building, bridge, or equipment operable in space-like environments (e.g., satellite, rockets, missiles, space station components, space vehicles, space simulators). Generally speaking, examples of the present disclosure describe methods and systems for enabling the use of UAVs 102, also known as drones, for remote NDI of structures beyond simple visual inspection with a visual or IR camera. The UAV 102, as will be described below in greater detail, includes one or more support structures that are attached or integrated at one end (i.e., proximal end) to the UAV 102 and supports one or more NDI scanning devices 104, or other end effectors, at the other end (i.e., distal end).

The UAV 102 can also enable maintenance activities, such as painting, sanding, and location tagging for periodic remote inspection. Adhesive tags, paint, etc. can also be left attached for future reference, or enable 3-D visualization. Various systems and methods may be used to hold the NDI devices on a surface of a target structure 100 to be inspected, including, but not limited to, magnetic-based, vacuum-based, electrostatic-based, adhesive-based, or gripper-based systems and methods. In some examples, more than one of these attachment mechanisms can be used in combination. In the magnetic-based approach, an Electro-Permanent ("EP") magnet can be enabled with an electrical pulse and can stay energized without using power. In the vacuum-based approach, the UAV can include one or more electric ducted fans or other suction general devices configured to produce respective suction forces at respective suction zones. In the electrostatic-based approach, electrostatic forces are used between a substrate material (e.g., surface of the structure being inspected) and an electroadhesive surface on the support structure or the NDI device. In this approach, electroadhesive devices (e.g., pads, wheels, tracks, etc.) are comprised of conductive electrodes that are deposited on the surface of a polymer. In the gripper-based approach, the one or more support structures can include an end portion having one or more gripping portions that, when actuated, can open or close to physically hold onto a portion of the structure being inspected.

In one example operation, a UAV 102 equipped with one or more NDI scanning devices 104 supported by one or more support structures (see FIG. 2), such as a support arm, is flown to a target region of the target structure 100. A UAV operator instructs the UAV 102 to position the NDI scanning device 104, such as by extending the support arm, onto a target region of the target structure 100. The NDI scanning device 104 is movably secured to the target structure 100 (e.g., secured by a mechanism implementing an EP magnet, a vacuum device, an electrostatic device, an adhesive device, or gripper device). In other embodiments, the UAV 102 movably secures the NDI scanning device 104 to the surface by applying, via the compliant support arm, pressure to the NDI scanning device 104. The EP magnet can be enabled with an electrical pulse and then stay energized without using power. The NDI scanning device 104 can then be activated to take inspection readings. A 3D location of the NDI scanning device 104, with respect to the target structure 100, can be measured by an off-board tracking system, such as a local positioning system ("LPS"). The NDI scanning device 104 maintains a history of the locations that have been scanned. Once the NDI inspection is complete the process may be repeated or in some embodiments or use cases the securing mechanism is deactivated, and the UAV flies away.

Figure 2:
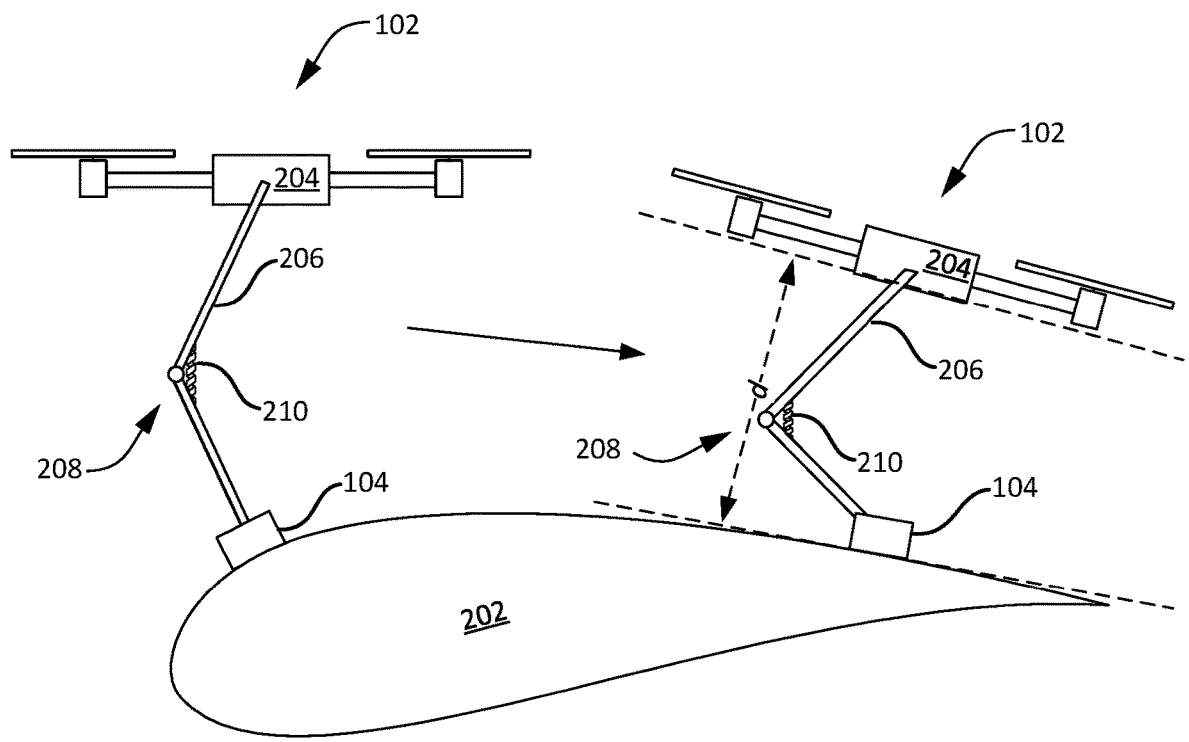
FIG. 2 is a side-view diagram illustrating another embodiment of a target structure on which non-destructive testing is performed utilizing the UAV in accordance with embodiments of the present disclosure.

FIG. 2 is a side-view diagram illustrating another embodiment of a target structure 202 on which non-destructive testing is performed utilizing the UAV 102 in accordance with embodiments of the present disclosure. As described above, the target structure 202 may be a portion of an airplane. Depicted here, the UAV 102 is directed to inspect the wing of airplane, a cross-section of which is identified by reference number 202. The UAV 102, in certain embodiments, includes a body structure 204 on which one or more support arms 206 are arranged. The one or more support arms 206 are attached to the body structure 204 at a first (proximal) end. Each of the one or more support arms 206 are connected at a second (distal) end with the NDI scanning device 104. The articulated support arm 206 is configured, in certain embodiments, with a passive or active end effector mechanism at the distal end for manipulating one or more maintenance tools including, but not limited to, grippers, sanders, drills, brushes, paint sprayers, markers, ink stamps, etc.

The support arm 206, in some embodiments, is implemented as an articulating arm with one or more pivot joints 208. The one or more pivot joints 208 allow the UAV 102 to apply a predetermined and an approximately constant pressure to the target structure 202, via the NDI scanning device 104, regardless of a distance d between the UAV 102 and the target structure 202 while the NDI scanning device 104 is in contact with the target structure 202. This may be accomplished with one or more compression springs 210 that span the pivot joints 208. Alternatively, other compliant mechanisms may be implemented to apply a biasing force to the NDI scanning device 104. The articulated support arm 206 is extendable and rotatable to position and orient the NDI scanning device 104 near the target structure 202. The UAV 102 is configured to use proximity sensors and/or visual cameras to determine when the UAV 102 is at the proper distance to automatically deploy or extend the support arm 206. Alternatively, the articulated support arm 206 may be constantly in a deployed configuration ready for coupling the NDI scanning device 104 to the target structure.

In one example, the compression spring 210 is provided with a long travel length and a pre-loaded rest position so that the compression spring 210 applies an approximately proportional force along the compression stroke of the spring. Alternatively, the UAV 102 may be configured to measure the pressure applied to the NDI scanning device 104 and modify the distance between the UAV 102 and the target structure 202 to maintain a desired pressure. For example, the desired pressure is selected to maintain contact between the NDI scanning device 104 and the target structure 202 while allowing the NDI scanning device 104 to slide across the surface of the target structure 202. As discussed above, the NDI scanning device 104 is configured with an attachment mechanism (e.g., EP magnet, electroadhesive, etc.), and accordingly, the NDI scanning device 104 supports its own weight and in some cases may reduce the burden of the UAV 102, and subsequently extends the run-time of the UAV 102.

Each NDI scanning device 104 is formed of a housing that houses one or more sensors including, but not limited to, eddy current sensors, ultrasonic sensors, acoustic sensors, mechanical impedance sensors, optical sensors, x-ray backscatter sensors, computed tomography sensors, surface roughness sensors, IR thermography, microwave sensors, and terahertz sensors. The UAV 102 moves the NDI scanning device 104 across the surface of the target structure 202 to allow the one or more sensors to scan for damage to the target structure 202. In other embodiments, as will be described in greater detail below, the NDI scanning device 104 is provided with a locomotion mechanism (e.g., a motor-driven wheels) for moving around on the surface of the target structure 202. Alternatively, passive wheels are provided with rotational encoders to measure distance. In this example, the UAV 102 may be configured to operate in a "follower" mode while the end effector is traversing the surface of the target structure 202.

Figure 3:
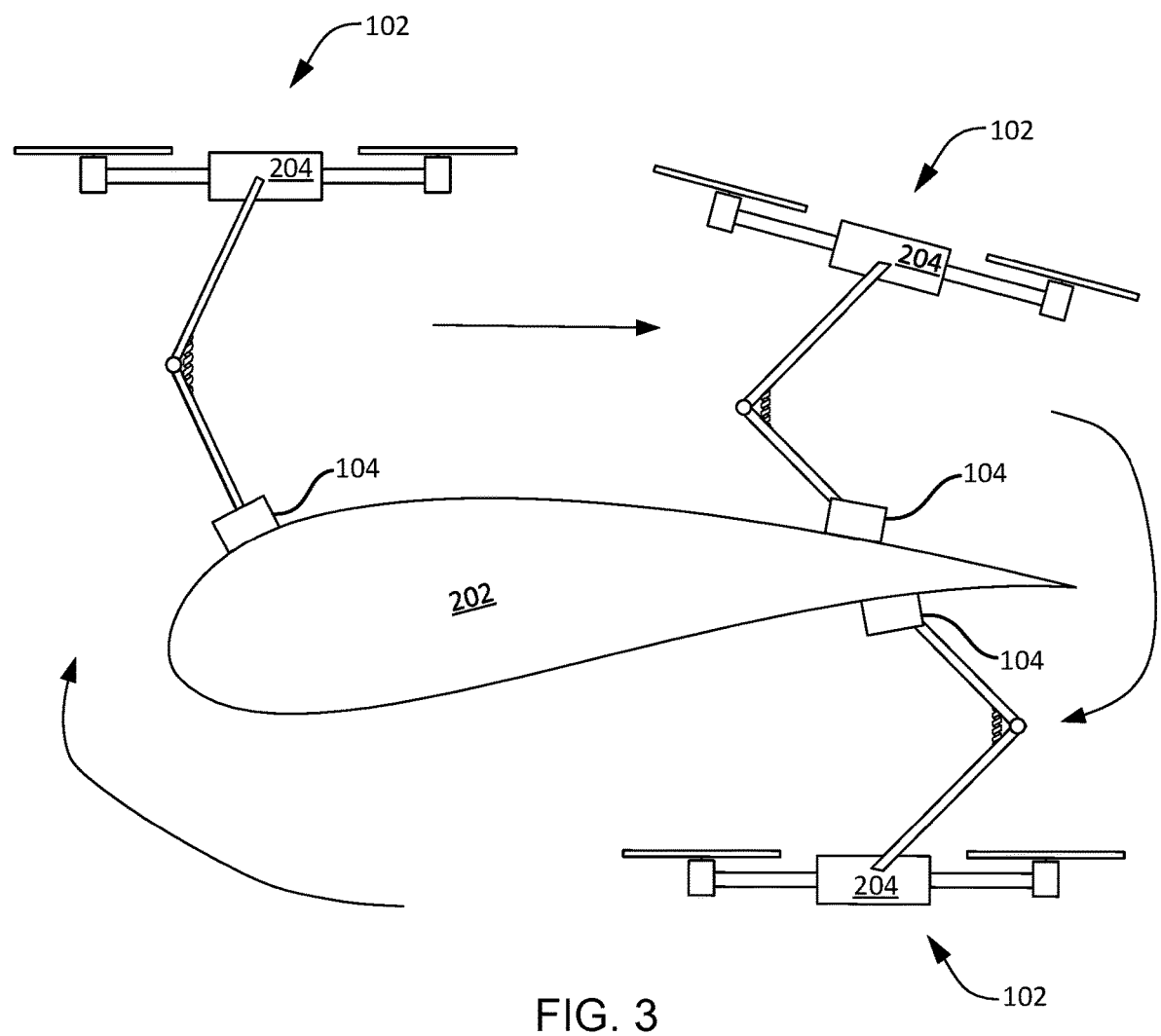
FIG. 3 is a side-view diagram illustrating one embodiment of a scanning pattern of a NDI scanning device in accordance with embodiments of the present disclosure.

FIG. 3 is a side-view diagram illustrating one embodiment of a scanning pattern of a NDI scanning device 104 in accordance with embodiments of the present disclosure. In the depicted embodiment, the UAV 102 directs the NDI scanning device 104 in a pattern across the surface of the target structure 202. The articulated support arm 206 of the UAV 102 is configured to extend above and below the UAV body structure 204 to allow the UAV 102 to position the NDI scanning device 104 in different areas of the target structure 202. In the depicted embodiment, this allows the UAV 102 to position the NDI scanning device 104 on the underside of an airplane wing.

The UAV 102 is configured to follow a pattern using distance measuring feedback and/or positioning methods (e.g., omni wheels with rotational encoders on the surface, or a ground-based high-resolution camera with tracking capabilities), so that the surface of the target structure 202 is sufficiently scanned by the NDI scanning device 104 or maintained by a sander, cleaner, painter, etc.

Any data collected is transferred (e.g., transmitted wirelessly) to an electronic processing device for real-time and/or post-scan analysis. Additionally, the data may be stored in a memory device in the NDI scanning device 104 and retrieved later. The pattern may be a pre-determined pattern defined by an operator and followed by the UAV 102 until completion. Alternatively, the UAV 102 may determine when the entire surface of the target structure 202 has been scanned using visual data obtained from a camera. In another embodiment, the UAV 102 receives an instruction from the NDI scanning device 104 that the entire surface of the target structure 202 has been scanned.

Figure 4:
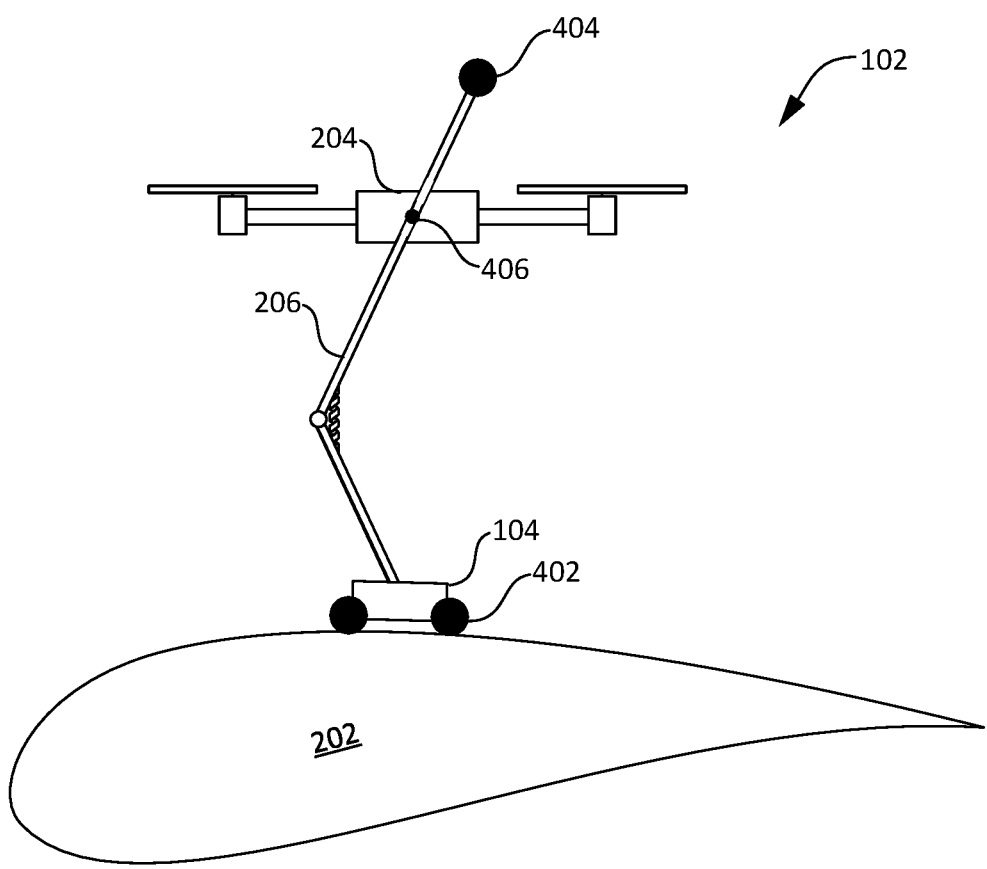
FIG. 4 is a side-view diagram illustrating another embodiment of a target structure on which non-destructive testing is performed utilizing the UAV and wheeled device containing the NDI scanner in accordance with embodiments of the present disclosure.

FIG. 4 is a side-view diagram illustrating another embodiment of a target structure 202 on which non-destructive testing is performed utilizing the UAV 102 in accordance with embodiments of the present disclosure. As described above, the NDI scanning device 104 is a passive scanning device that is slid across the surface of the target structure 202. The NDI scanning device 104, in certain embodiments, includes mechanisms for facilitating the movement of the NDI scanning device 104 across the surface of the target structure 202. For example, the NDI scanning device 104 includes wheels 402. In some embodiments the wheels are undriven and allow the UAV 102 to direct the movement of the NDI scanning device 104.

Alternatively, the NDI scanning device 104 is operable to move along or around the surface of the target structure 202 using one or more locomotion mechanisms, such as using tracks, wheels (e.g., holonomic wheels), articulating arms, etc. The locomotion may be used in conjunction with the securing mechanism such as by turning on and off the securing mechanism in a controlled manner. The NDI scanning device 104, in certain embodiments, includes a body capable of supporting multiple wheels, for example 4 wheels. In some embodiments, at least two of the wheels may be independently controllable to direct the movement of the NDI scanning device 104 across the surface of the target structure 202.

In certain embodiments, the articulated support arm 206 includes a counterbalance arm 404 to counteract the effect of the weight of the NDI scanning device 104 on the UAV 102. The counterbalance arm 404 may extend past a pivot point 406 and include a weight selected to provide a balancing torque to that of the NDI scanning device 104. The counterbalance weight of the arm 404 may be integral to the support arm 206. The position of the articulated support arm 206 with respect to the pivot point 406 may be adjusted according to the payload being carried by the UAV 102 (e.g., NDI scanning device 102, sanding device, paint brush, etc.). For example, the articulated support arm 206 may be provided with a plurality of positioning openings through which a rod may pass that secures the articulated support arm 206 to the UAV 102. Increasing the distance between the pivot point 406 and the counterbalance weight of the counterbalance arm 404 results in an increased balancing torque.

Figure 5:
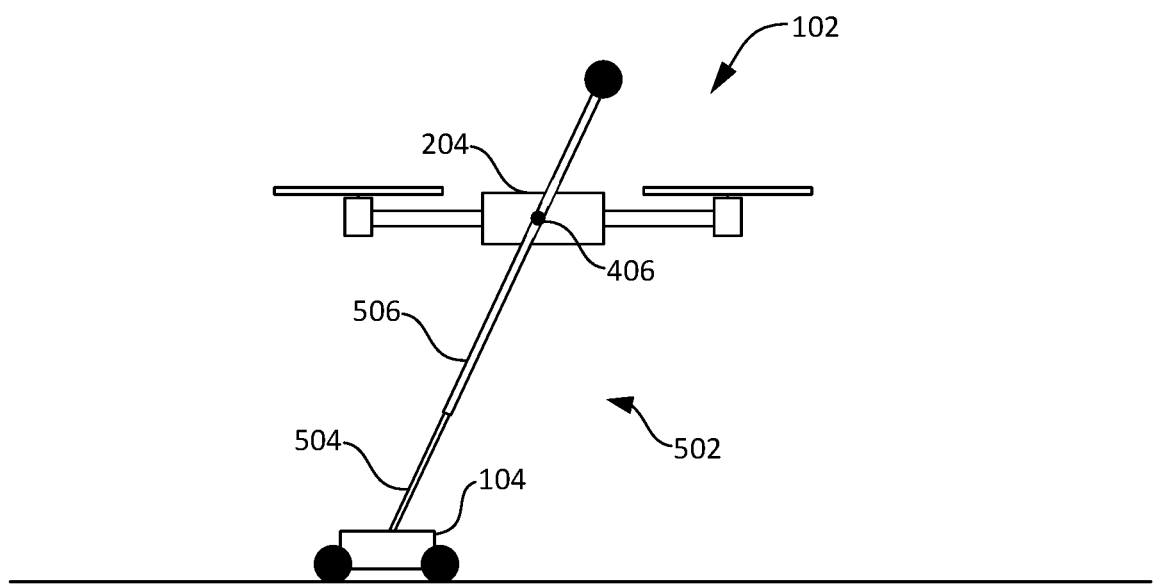
FIG. 5 is a side-view diagram illustrating another embodiment of the UAV with a compliant telescopic arm in accordance with embodiments of the present disclosure.

FIG. 5 is a side-view diagram illustrating another embodiment of the UAV 102 in accordance with embodiments of the present disclosure. In the depicted embodiment, the support arm includes a telescoping arm 502. In some embodiments, the telescoping arm 502 is formed having at least two slidable nesting portions. The first portion 506 of arm 502 is rotationally coupled at a first (proximal) end to the body structure 204. A second (distal) end of the first portion 506 of support arm 502 is configured to slidably engage the proximal end of the second portion 504 of support arm 502, which is rotationally coupled at its distal end to the NDI scanning device 104.

A compliant element (e.g., a spring) may be disposed within a cavity of the second portion to bias the first portion 504 with respect to the second portion 506. Accordingly, the UAV 102 is configured to apply an approximately constant pressure to the surface of a target structure regardless of the distance between the UAV 102 and the surface, when the NDI scanning device 104 is in contact with the surface. As such, minor deviations in a flight path of the UAV 102 does not affect the operation of the NDI scanning device 104. Stated differently, if the distance between the UAV 102 and the surface of the target structure varies, the support arms described above with reference to FIGS. 1-5 are configured to absorb such variations without affecting the analysis of the surface.

Figure 6A:
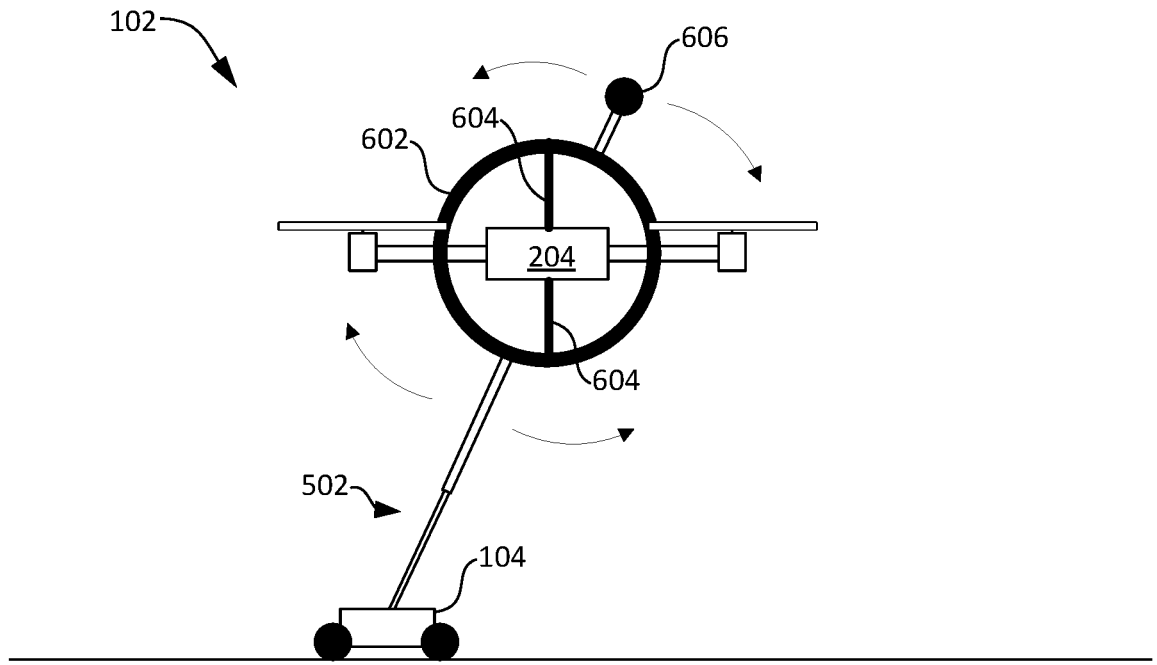
FIG. 6a is a side-view diagram illustrating another embodiment of the UAV with a ring-based mount in accordance with embodiments of the present disclosure.

FIG. 6a is a side-view diagram illustrating another embodiment of the UAV 102 in accordance with embodiments of the present disclosure. In certain embodiments, the UAV 102 includes a NDI scanning device mount structure ("mount") 602 that encircles the body structure 204 of the UAV 102. Mount arms 604 couple the mount 602 to the body structure 204 of the UAV 102. The mount 602, in some embodiments, is disposed substantially centrally between the rotor blades 610 (see FIG. 6b) of the UAV 102. Other configurations are contemplated that substantially balance the mount 602 both laterally and longitudinally with respect to the body structure 204 of the UAV 102.

In certain embodiments, the telescoping arm 502 is coupled at a first (proximal) end to the NDI scanning device 104, and at a second end to the mount 602, which can be annular or circular shaped. The telescoping arm 502 may be rigidly coupled to the mount 602 to allow the control system of UAV 102 to control the orientation of the NDI scanning device 104. The telescopic arm 502 may also have a compliant element or compliant member between the sliding segments of the arm. Although depicted at roughly a 7 o'clock position, the UAV 102 may orient the telescoping arm to other rotational angles (e.g., 3 or 9 o'clock) with the telescoping arm 502 extending outward from the mount 602 in a substantially vertical plane. This allows the UAV 102 to position the NDI scanning device 104 on wide variety surfaces while still allowing stable and controllable motion of the UAV 102. In alternate embodiments, the mounting ring may be configured in a horizontal plane.

In some embodiments, the mount 602 includes a counterbalance weight 606 oriented opposite the telescoping arm 502 to counter the effect of the weight of the NDI scanning device 104. Rotating mechanisms in operable communication with the UAV 102 rotate and position the telescoping arm 502 and the counterbalance weight 606 in response to the surface to be scanned by the NDI scanning device 104. The rotating mechanism may move the telescoping arm 502 together with the counterbalance weight 606, or alternatively independently from the counterbalance weight 606. The rotating mechanism may include multiple rings that are movable independent of each other. At least one of the rings is fixedly coupled with the mount arms 604. A gear disposed between the fixed ring and a movable ring may be actuated to move a ring that is coupled with the telescoping arm 502 to move the NDI scanning device 104. Although depicted here with the telescoping arm 502, the mount 602 may be implemented with the articulated support arm 206 described above with reference to FIG. 2.

Figure 6B:
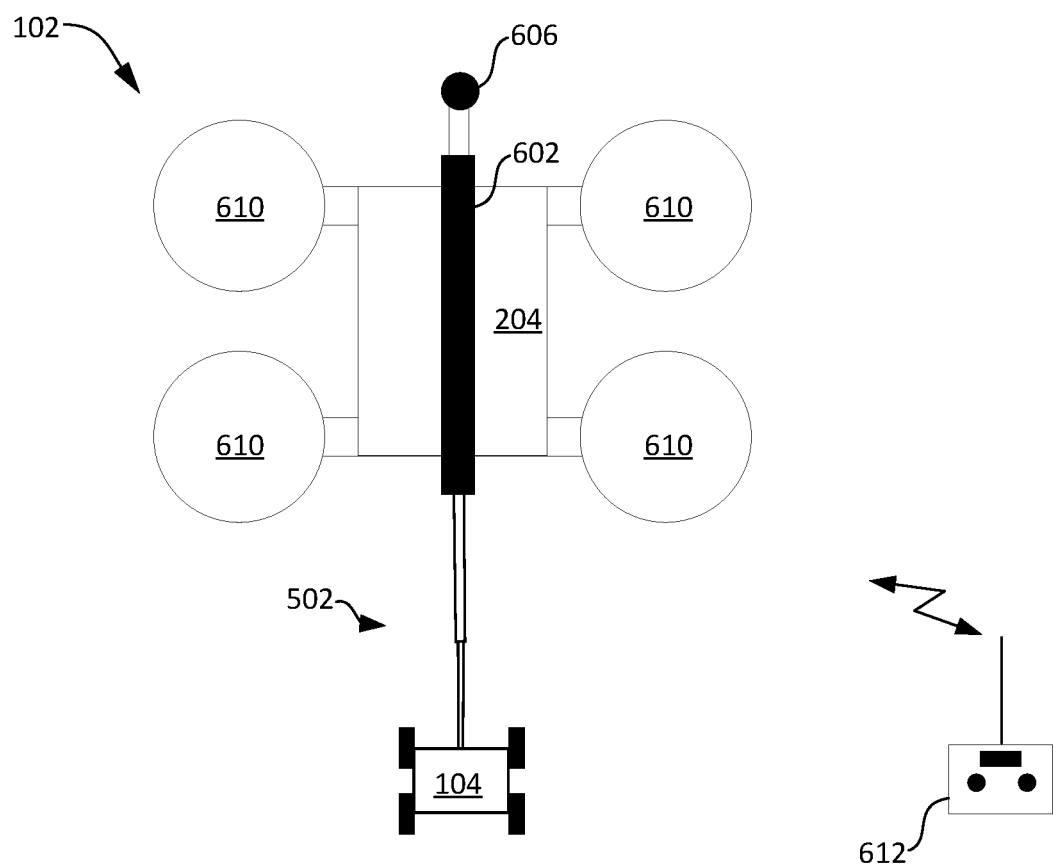
FIG. 6b is a top-view diagram illustrating another embodiment of the UAV in accordance with embodiments of the present disclosure.

FIG. 6b is a top-view diagram illustrating another embodiment of the UAV 102 in accordance with embodiments of the present disclosure. As discussed above with reference to FIG. 6a, the mount 602 encircles the body structure 204. In certain embodiments, the mount 602 is disposed between rotors 610 of the UAV 102 so as to not interfere with the flying capability of the UAV 102. In general, the UAV 102 includes one or more rotors 610 that are controllable to direct the UAV 102 to the targeted structure 100 and conduct NDI using the NDI scanning device 104. The UAV 102 may be autonomous and capable of following a pre-determined flight path, or may be controllable from a remote controller 612.

Figure 7:
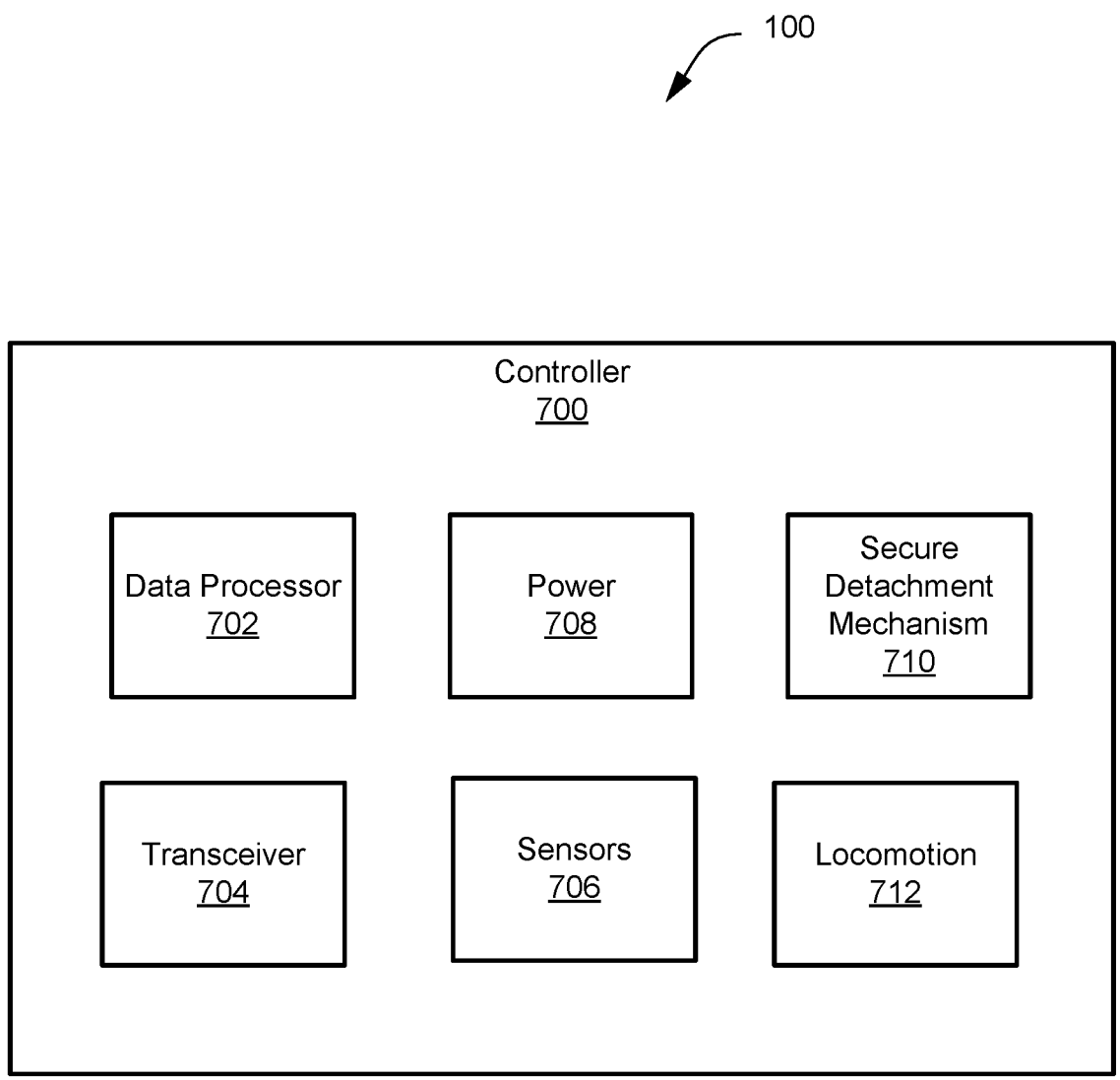
FIG. 7 is a schematic block diagram illustrating one embodiment of a controller for NDI scanning in accordance with embodiments of the present disclosure.

FIG. 7 is a schematic block diagram illustrating one embodiment of a controller for NDI scanning in accordance with embodiments of the present disclosure. The UAV 102, together with the NDI scanning device 104, form a system that is used to capture information corresponding to the targeted structure 100. A controller 700 operably coupled to either the UAV 102 or the NDI scanning device 104, includes a data processor 702 that processes the information captured by the system and directs the UAV 102 and the NDI scanning device 104 to perform a method for nondestructive inspection of the targeted structure 100. The data processor 702 may be any suitable information handling device capable of processing the captured information. In one example, the data processor 702 is a computer, a smart phone, a processing device, or the like. In one example, the data processor 702 includes one or more processors for processing the captured information. The captured information may be transmitted, via a transceiver 704, to a display for showing a mapping of the surface of the targeted structure 100 produced from the captured information. The data processor 702 receives captured information (e.g., data) and produces an image corresponding to the data. In an example, the data processor 702 produces a two-dimensional mapping of a surface of an object and/or a three-dimensional mapping of the surface of the object.

As used herein, the targeted structure 100 (e.g., an object) has a potential defect if there is an anomaly detected under the surface of the targeted structure 100, such as a deformation resulting from air trapped under the surface of the targeted structure 100. In some situations, the air trapped under the surface of the targeted structure 100 result from disbonded materials (e.g., lack of bonding between materials) under the surface of the targeted structure 100. The system is configured to be used to detect the defect in the targeted structure 100.

The controller 700 includes sensors 706 that can be operable to detect one or more contact-based, non-contact based, or both sensing modalities. The sensors 706 can include, but are not limited to, eddy current sensors, ultrasonic sensors (and other proximity sensors), acoustic sensors, mechanical impedance sensors, optical sensors (e.g., optical cameras), x-ray backscatter sensors, computed tomography sensors, surface roughness sensors, IR thermography, microwave sensors, and terahertz sensors. The controller 700 can also optionally include a power source 708, a secure/detachment mechanism 710, and a locomotion mechanism 712 all connected via a communication bus. In some embodiments, the power source 708 can provide power to one or more of the subsystems (e.g., the UAV 102, the NDI scanning device 104, ring mount 602, etc.). In some examples, additional power or total power may be provided by a tether connected to the UAV 102. The optional tether can also be used to transmit and receive command or data signals to and from the one or more NDI sensors 706, as well as provide a safety and retrieval mechanism for the system.

The secure/detachment mechanism 710 can include the one or more securing mechanism disclosed herein. The transceiver 704 can be configured to provide location and/or measurement data from the one or more NDI sensors 706 to the wireless UAV controller 102 and/or the remote inspection station. The controller 700 is programed with instructions to control one or more of the subsystems of the UAV 102 and the NDI scanning device 104 and/or communicate via the transceiver 704 with a wireless UAV controller and/or the remote inspection station. The locomotion mechanism 712 can be operable to move the NDI scanning device 104 along or around the surface of the targeted structure 100 disclosed herein.

In certain embodiments, the sensors 706 include a pressure sensor to detect the amount of pressure the UAV 102 is applying to the surface of the targeted structure 100 via the NDI scanning device 104. The processor 702 is configured to receive the pressure information and adjust a distance between the targeted structure 100 and the UAV 102 to maintain slidable contact between the NDI scanning device 104 and the targeted structure 100. If the pressure is too great, the NDI scanning device 104 may not slide properly. If the pressure approaches 0, indicating a lack of contact, the sensors 706 of the NDI scanning device 104 may not function properly. Alternatively, the controller 700 uses one of the other sensors for maintaining a proper distance between the UAV 102 and the targeted structure 100.

Figure 8:
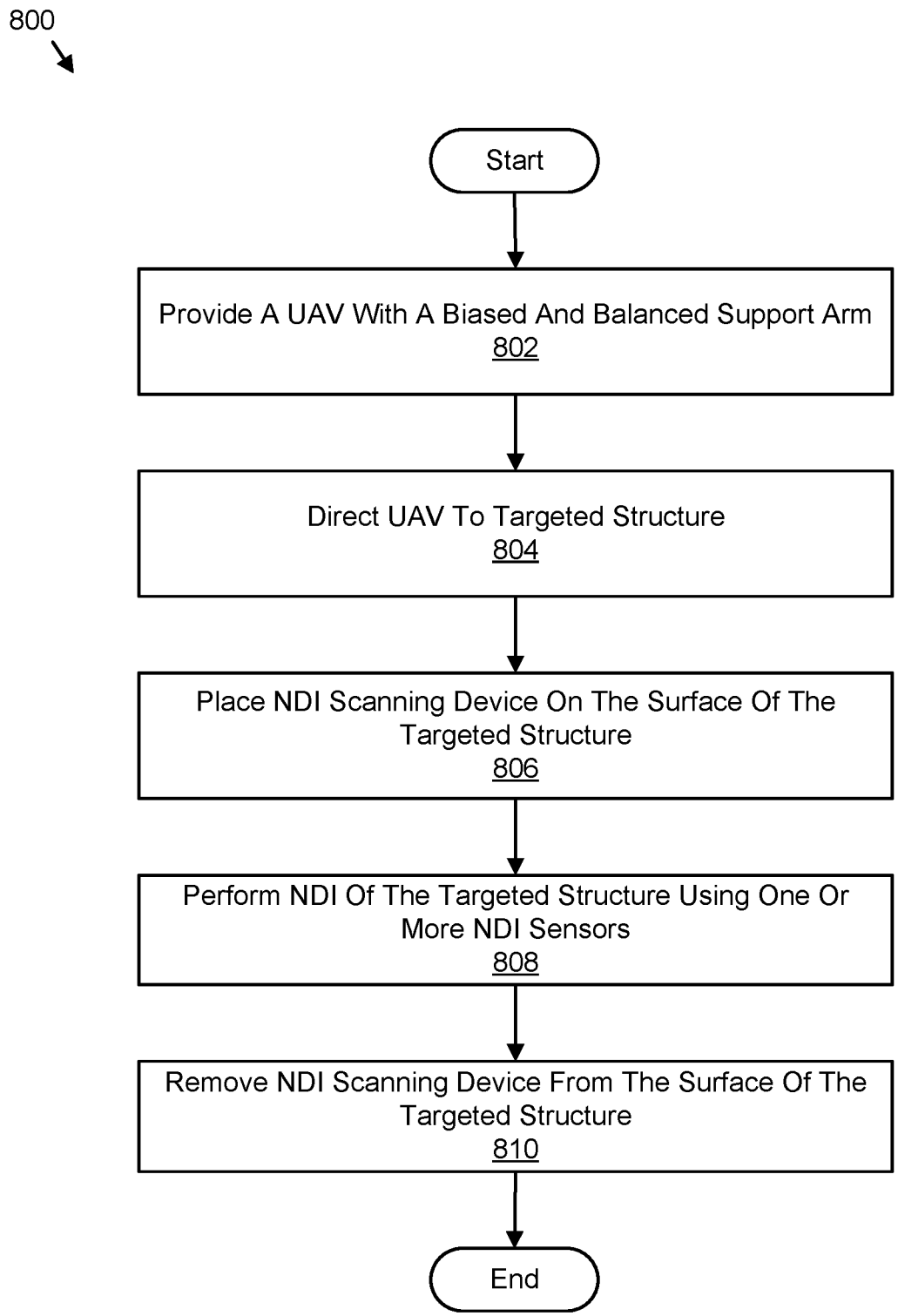
FIG. 8 is a schematic flowchart diagram illustrating one embodiment of a method of non-destructive inspection in accordance with embodiments of the present disclosure.

FIG. 8 is a schematic flowchart diagram illustrating one embodiment of a method 800 of non-destructive inspection in accordance with embodiments of the present disclosure. Portions of the method 800 may be performed by processing logic that may comprise hardware (e.g., circuitry, dedicated logic, programmable logic, microcode, etc.), software (such as instructions run on a processing device), firmware, or a combination thereof. In one embodiment, the method 800 is performed by the controller 700 of FIG. 7.

The method 800 starts, and at block 802, a UAV is provided having a compliant and balanced support arm. In certain embodiments, a biased support arm includes, as described above, a biasing mechanism such as a spring to provide a biasing force between a first portion and a second portion of the support arm. In alternative embodiments, the biasing force is provided by an elastic, or compressed air. At block 804, the processing logic directs the UAV to the targeted structure. For example, the UAV can include an onboard system that is able to navigate the UAV in accordance with a preprogrammed flight plan and to enable inspection data for the targeted structure being inspected to be obtained and/or can be flown along a flight path by an operator using a wireless UAV controller.

At block 806, the processing logic places the NDI scanning device on the surface of the targeted structure and maintains contact between the NDI scanning device and the surface of the targeted structure. For example, the processing logic analyzes the surface of the targeted structure to determine a distance to the surface and approaches the surface until making contact between the NDI scanning device and the surface. The processing logic also instructs the securing mechanism (e.g., EP magnet, electroadhesive, etc.) to couple the NDI scanning device to the surface. The processing logic then maintains a proper distance from the surface. The compliant support arm compensates for deviations from this proper distance.

At block 808, the processing logic performs non-destructive inspection of the surface using one or more NDI sensors. At block 810, the processing logic decouples the NDI scanning device from the surface of the targeted structure, and the method 800 ends.

Figure 9:
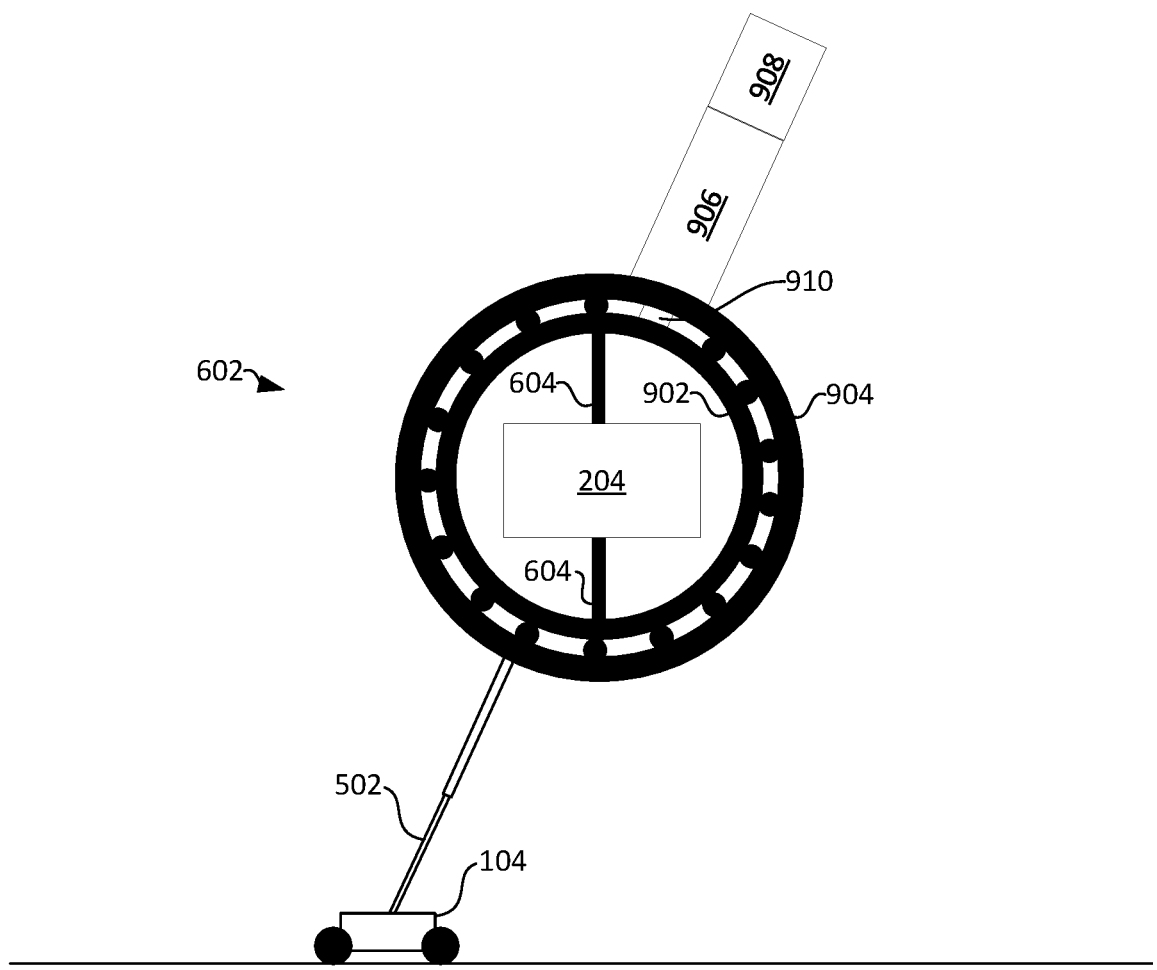
FIG. 9 is a side-view diagram illustrating another embodiment of a mount of a UAV in accordance with embodiments of the present disclosure.

FIG. 9 is a side cross-sectional view diagram illustrating another embodiment of the mount 602 in accordance with embodiments of the present disclosure. For clarity, some of the components of the UAV 102, such as the rotors blades 610, are not depicted. In the depicted embodiment, the mount 602 includes at least two rings 902, 904 that encircle the body structure 204 of the UAV 102. The inner ring 902 is fixedly coupled to the body structure 204 via the mount arms 604. The outer ring 904, in certain embodiments, is configured to rotate with respect to the inner ring 902. Ball bearings may be disposed between the inner ring 902 and the outer ring 904 to facilitate the sliding and rotating movement of the outer ring 904 with respect to the inner ring 902.

In some embodiments, a motor 906 and a battery 908 act as a counterbalance weight to the NDI scanning device 104, and may be fixedly coupled to the outer ring 904 opposite the support arm 502. A gear 910, driven by the motor 906, may engage the inner ring 902 and rotate the outer ring 904 in response to a command from the controller 700. Accordingly, this allows the controller to cause the motor 906 to position the NDI scanning device 104, via the outer ring 904, in any angular position between 0 and 360 degrees.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A non-destructive inspection ("NDI") system, the system comprising:
   an unmanned aerial vehicle ("UAV") comprising a body structure having at least one support arm, where the at least one support arm comprises:
      a first arm portion having a first end coupled to the body structure and a second end coupled to a second arm portion;
      the second arm portion having a first end coupled to a NDI scanning device and a second end coupled to the second end of the first arm portion;
      a flexible compliant member capable of elastic deformation disposed between the first arm portion and the second arm portion, where the compliant member biases movement of the second arm portion with respect to the first arm portion; and
   where the NDI scanning device is formed with a housing comprising one or more NDI sensors.

2. The NDI system of claim 1, where the first arm portion is pivotally coupled to the second arm portion.

3. The NDI system of claim 1, where the second arm portion is slidably coupled to the first arm portion and telescopes into the first arm portion.

4. The NDI system of claim 1, further comprising a ring mount encircling, and coupled with, the body structure, the ring mount comprising an inner ring element and an outer ring element that rotates with respect to the inner ring element.

5. The NDI system of claim 4, where the at least one support arm is rigidly coupled with the outer ring element of the ring mount at the first end of the first arm portion.

6. The NDI system of claim 1, where the at least one support arm comprises a first support arm, and further comprising a second support arm coupled with the body structure and having a weight to counterbalance the at least one support arm and the NDI scanning device.

7. The NDI system of claim 1, where the NDI scanning device further comprises a mounting mechanism to couple the NDI scanning device to a surface of a structure, where the mounting mechanism is magnetic-based, vacuum-based, electrostatic-based, gripper-based, or adhesive-based.

8. The NDI system of claim 1, where the UAV is operable to move using a predetermined flight path using position and orientation data obtained from a tracking system or controlled using a remote-control system.

9. The NDI system of claim 1, where the one or more NDI sensors comprises at least one of: eddy current sensors, ultrasonic sensors, acoustic sensors, mechanical impedance sensors, optical sensors, x-ray backscatter sensors, computed tomography sensors, surface roughness sensors, IR thermography, microwave sensors, and terahertz sensors.

10. The NDI system of claim 1, where the one or more NDI sensors are moved relative to a structure to be inspected.

11. The NDI system of claim 1, where the at least one or more support arms is configured to support one or more maintenance tools, where the one or more maintenance tools comprise one of a sander, a drill, a brush, a paint sprayer, a marker, an ink stamp, a laser, or a target applicator.

12. The NDI system of claim 1, where the NDI scanning device further comprises a locomotion mechanism for moving the NDI scanning device around a surface to be inspected.

13. The NDI system of claim 1, where the compliant member comprises a spring.

14. The support arm of claim 13, where the spring is a compression spring that applies an approximately proportional force along a compression stroke of the compression spring.

15. A support arm for a non-destructive inspection ("NDI") system, the support arm comprising:
   a first arm portion having a first end coupled to a body structure of an unmanned aerial vehicle ("UAV") and a second end coupled to a second arm portion;
   the second arm portion having a first end coupled to the second end of the first arm portion and a second end coupled to an NDI scanning device; and
   a flexible compliant member capable of elastic deformation disposed between the first arm portion and the second arm portion, where the compliant member biases movement of the second arm portion with respect to the first arm portion.

16. The support arm of claim 15, where the first arm portion is pivotally coupled to the second arm portion.

17. The support arm of claim 15, where the second arm portion is slidably coupled to the first arm portion and telescopes into the first arm portion.

18. A method of non-destructive inspection ("NDI") of an object, comprising:
   providing an unmanned aerial vehicle ("UAV") comprising a body structure having at least one support arm, where the at least one support arm comprises:
      a first arm portion having a first end coupled to the body structure and a second end coupled to a second arm portion;
      the second arm portion having a first end coupled to the second end of the first arm portion and a second end coupled to an NDI scanning device;
      a flexible compliant member capable of elastic deformation disposed between the first arm portion and the second arm portion, where the compliant member biases movement of the second arm portion with respect to the first arm portion; and
      where the NDI scanning device is formed with a housing comprising one or more NDI sensors;
   directing the UAV to a target location of a structure;
   placing the NDI scanning device on the a surface of the structure at the target location; and
   performing NDI of the surface using the one or more NDI sensors while directing the NDI scanning device in a scanning pattern across the surface of the structure.

19. The method of claim 18, where placing the NDI scanning device on the surface of the structure at the target location further comprises applying approximately constant pressure to the structure via application of a biasing force to the NDI scanning device from the compliant member.

20. The method of claim 18, where directing the NDI scanning device in the scanning pattern across the surface of the structure comprises at least one wheel comprising a rotational encoder, attached to the NDI scanning device, wherein the rotational encoder is capable of following the scanning pattern across the surface of the structure.

* * * * *